United States Patent
Nishii et al.

[11] Patent Number: 5,872,699
[45] Date of Patent: Feb. 16, 1999

[54] ELECTRONIC APPARATUS, HOUSING FOR ELECTRONIC APPARATUS AND HOUSING MANUFACTURING METHOD

[75] Inventors: Kota Nishii; Kouichi Kimura; Masanobu Ishizuki; Katsura Adachi; Hiroki Uchida, all of Kanagawa, Japan

[73] Assignee: Fujitsu Limited, Kanagawa, Japan

[21] Appl. No.: 683,988

[22] Filed: Jul. 19, 1996

[30] Foreign Application Priority Data

Jul. 25, 1995 [JP] Japan .................................. 7-189477

[51] Int. Cl.⁶ .................................................. H05K 7/20
[52] U.S. Cl. ...................... 361/699; 165/104.33; 361/687
[58] Field of Search ............... 174/35 R, 35 MS, 174/15.2; 62/3.2, 3.5, 259.2; 165/185, 80.3, 80.4, 46, 104.33; 257/706, 707, 713–715, 729, 930; 361/687, 699, 700, 704, 705, 736, 707–712, 717–719, 752

[56] References Cited

U.S. PATENT DOCUMENTS

| | | | |
|---|---|---|---|
| 4,150,191 | 4/1979 | Karki | 428/454 |
| 5,266,834 | 11/1993 | Nishi | 257/706 |
| 5,278,429 | 1/1994 | Takenada | 257/678 |
| 5,313,362 | 5/1994 | Hatada | 361/709 |
| 5,329,427 | 7/1994 | Hogdahl | 361/728 |
| 5,402,311 | 3/1995 | Nakajima | 361/687 |
| 5,608,267 | 3/1997 | Mahulikar | 257/796 |
| 5,646,824 | 7/1997 | Ohashi | 361/699 |

FOREIGN PATENT DOCUMENTS

| | | |
|---|---|---|
| 5-114664 A | 5/1993 | Japan . |
| 5-261823 A | 10/1993 | Japan . |
| 5-269787 A | 10/1993 | Japan . |
| 7-124995 A | 5/1995 | Japan . |
| 8-008567 A | 1/1996 | Japan . |

*Primary Examiner*—Gerald P. Tolin
*Attorney, Agent, or Firm*—Armstrong, Westerman, Hattori, McLeland & Naughton

[57] ABSTRACT

An electronic apparatus comprising a housing, and an electronic part accommodated in the housing, wherein the housing includes a metallic member and a resin member molded integrally with the metallic member, the metallic member forming an outside part of the housing and being treated on its outer surface for enhancing a coefficient of heat radiation.

22 Claims, 11 Drawing Sheets

ELECTRONIC APPARATUS, HOUSING FOR ELECTRONIC APPARATUS AND HOUSING MANUFACTURING METHOD

BACKGROUND OF THE INVENTION

1. Field of the Invention

The present invention relates to a portable small-sized electronic apparatus such as a notebook type personal computer, a housing for the electronic apparatus, and a method for manufacturing the housing.

2. Description of the Related Art

In the portable electronic apparatus which is represented by a notebook-type personal computer, an electronic notebook, a pocket telephone and similar, a resin has been used for the housing which has the properties of light weight, good appearance, good insulating ability and similar.

However, about 30% of the weight of the apparatus is occupied by the housing. If the weight of the housing can be reduced, the apparatus can become lighter. For this reason, the housing has been made thinner. However, ABS resins which are usually used for the housing are hard to make thinner because of insufficient strength.

Accordingly, engineering plastics having high strength, such as aromatic polyamide or PPS resins or polymer alloys including PC-ABS resins, can be used, or a filler, such as carbon fiber, is added to the ABS resins, when the housing is molded.

However, the engineering plastics are difficult to mold thinner as compared with the ABS resins. Even if the engineering plastics are used, strength and rigidity are not enough. Also, in the case where the polymer alloys are used or the filler is added, the same problems arise.

In particular, a user may often drop the portable apparatus while carrying the same. For this reason, drop impact resistance is required, such that the apparatus is not broken, even if it is dropped at a height of about 1 m. In other words, the drop impact resistance must be such that as not only the housing, but also internal electronic parts, are not degraded if dropped.

In order to obtain such required performance, methods for forming the housing of metals are known, such as by aluminum sheet metal working, aluminum alloy die casting, Mg alloy die casting, or similar. However, the sheet metal working method is difficult to form a boss, a rib and a fitting portion. Furthermore, in the case where the aluminum alloy die casting method or similar is used, it is difficult to reduce the thickness of the housing to 1 mm or less.

In addition, there is a possibility that such a metal housing is so high in rigidity that the impact force of the housing being dropped cannot be absorbed. In other words, the housing is not, broken upon being dropped but the internal electronic parts are damaged or degraded.

Thus, the above-mentioned required characteristics of strength, moldability, impact resistance and similar cannot be completely obtained by a housing made of a single material such as a metal or a resin.

Japanese Unexamined Patent Application Nos. Hei 5(1993)-114664, Hei 5(1993)-261823 and Hei 5(1993)-269787 have disclosed the combination of a metal and a resin, for example, a laminated product of a resin layer formed on the inner face of a housing which is molded of a metal.

However, the electronic parts taught by the above-mentioned Japanese Patent Applications, are accommodated in a portable electronic apparatus at a higher density with the requirement of high performance and small size. For this reason, a structure in which heat generated from the electronic parts is efficiently discharged to the outside of the apparatus has been required.

SUMMARY OF THE INVENTION

In consideration of the above-mentioned circumstances, it is an object of the present invention to provide a housing for an electronic apparatus wherein a metallic part of the housing formed by integrating a metal and a resin, which is exposed to the outside, is treated for enhancing a thermal emissivity so that the thermal emission ability can be improved as well as the moldability and the strength.

The present invention provides an electronic apparatus comprising a housing, and an electronic part accommodated in the housing, wherein the housing includes a metallic member and a resin member molded integrally with the metallic member, the metallic member forming an outside part of the housing, an outer surface of the metallic member being treated for enhancing a thermal emissivity thereof.

Further, the present invention provides a housing and a method for manufacturing the housing, the housing comprising a metallic member, and a resin member molded integrally with the metallic member, wherein the metallic member forms an outside part of the housing and the metalic member is treated on its outer surface for enhancing a thermal emissivity thereof.

BRIEF DESCRIPTION OF THE DRAWINGS

The present invention will be detailed in conjunction with the accompanying drawings in which.

DESCRIPTION OF THE PREFERRED EMBODIMENTS

Figure 1:
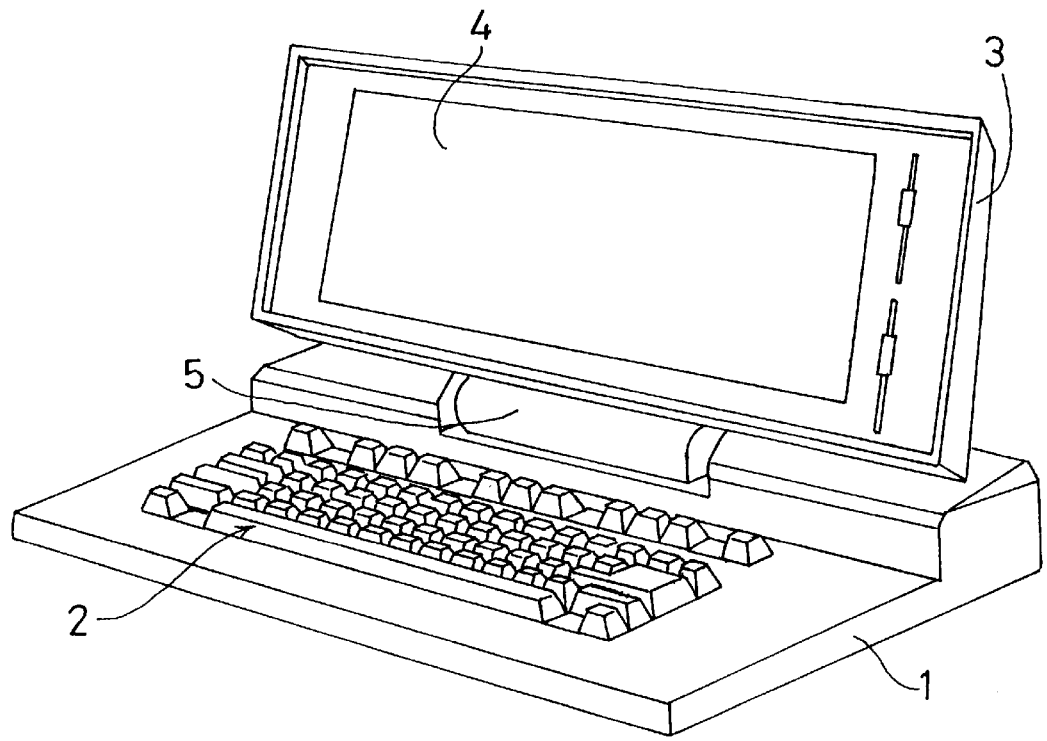
FIG. 1 is a perspective view showing a first embodiment.

The electronic apparatus according to the present invention comprises a housing and electronic parts which are accommodated in the housing. Examples of the electronic apparatus are a portable personal computer, a word processor, a telephone and similar.

The housing is formed of a metallic member and a resin member which is integrated with the metallic member. An aluminum plate is the most suitable for the metallic member due to its weight and mechanical strength. In addition, a copper plate, a stainless steel plate, a duralumin plate, an iron plate and similar may be used for the metallic member.

While thermoplastic resins such as PC-ABS resins, ABS resins, nylon-ABS resins or PBT-ABS resins may be applied to the resin member, amorphous thermoplastic resins which hardly cause a warp are more desirable.

The present invention is characterized in that the metallic member forms the outside part of the housing and the outer surface of the metallic member is treated for enhancing a thermal emissivity thereof. Examples of the treatment for enhancing the thermal emissivity are as follows.

As an example, the outer surface of the metallic member is coated with an organic or inorganic film. In this case, the organic film is formed by applying various coating materials such as epoxy, urethane, acrylic or similar resin. While it is desirable that the color of the film should be black for better thermal emissivity, the film is not restricted to being black.

For example, the inorganic film is a metallic oxide film. As a method for forming the oxide film, various well-known methods such as an anodic oxidation CVD method and similar can be used.

For another treatment, the outer surface of the metallic member is formed to be uneven or rough. As a method for forming the unevenness, or roughness on the outer surface of the metallic member a suede coating method may be used as well as an embossing finish method and a sand blasting method which are well-known.

The suede coating method is performed by applying a coating material which contains beads made of a resin having a diameter of 5 to 40 $\mu$m at a rate of about 10% so that the unevenness or roughness is formed on the outer surface of the metallic member. As such a coating material, WANISEDO U-2 (manufactured by Yukosha Co., Ltd.) can be used.

In consideration of the thermal emissivity, it is desirable that the height variation of the unevenness or roughness formed on the outer surface of the metallic member should be 0.7 $\mu$m or more.

Thermal emission is a form of energy transmission which is quite different from heat conduction. In other words, a part of the heat energy generated by the motion of molecules in a high-temperature substance is changed to emission energy which is transmitted in the form of electromagnetic waves in space. Accordingly, energy is radiated from all substances having the heat energy. Energy Q (W/m$^2$) emitted from a unit area of the substance surface per unit time is expressed by the following equation:

$$Q = \epsilon \cdot \sigma(T^4)$$

wherein $\epsilon$ is a thermal emissivity obtained from the properties and temperature of the substance surface (0<$\epsilon$<1), $\sigma$ is a Boltzmann's constant of 5.67×10$^{-8}$ (W/m$^2$·K$^4$), and T is the absolute temperature (K) of the substance.

The thermal emissivity $\epsilon$ infinitely approximates 0 on a polished face having remarkable metallic luster. On the contrary, the thermal emissivity $\epsilon$ approximates 1 for an inorganic substance such as an oxide face, and an organic substance such as a painting or coating material. The emission energy has the following characteristics. More specifically, when absorbed into a low-temperature substance, the emission energy is changed to thermal energy to raise the temperature of the low-temperature substance. At the same time, if the substance to which the energy is emitted has a high temperature, it is cooled.

For example, the aluminum plate has $\epsilon$ of 0.05 to 0.1, and hardly absorbs and emits heat rays such as infrared rays and far infrared rays. For this reason, a housing made of an aluminum plate hardly emits heat from the surface thereof so that it has a little cooling effect.

However, if an inorganic film is formed on the surface of the aluminum plate by performing an alumite treatment, or if an organic film is formed on the surface of the aluminum plate by using the technique such as coating so that the thermal emissivity can be increased to 0.7 or more, then, the cooling effect obtained by the thermal emission from the surface of the housing can be increased.

The infrared rays have a great effect that heat motion in a substance is excited to raise a temperature. The infrared rays have a wavelength of 0.7 to 30 $\mu$m. If the surface of the substance is a mirror, most of the infrared rays are reflected. If the surface of the substance has unevenness which is greater than the wavelength of the infrared rays, inter-reflection is caused so that a reflectance is decreased.

For this reason, it is necessary to not only take the characteristics of a material itself into consideration, but also make the surface of the substance rougher than the wavelength of the infrared rays in order to increase the thermal emissivity of the substance. While good effects can be obtained by making the metallic plate itself rough, it is more effective to form an organic or inorganic film having roughness on the outer surface of the metallic plate.

For example, if the organic film is coated by a spray method, a printing method or similar, the unevenness (roughness), having a height variation ranging from several tenths to several hundredth of a $\mu$m can be formed. Also, in the case where the inorganic film is formed by the alumite treatment, countless concave portions, having a diameter ranging from several to several tenths of a $\mu$m, are formed on the surface. Consequently, the unevenness of the surface is effective in enhancing the thermal emissivity.

In order to efficiently discharge the heat generated from the electronic parts accommodated in the housing to the outside, it is preferable that the metallic member should comprise a heat conductive member for connecting the inner face thereof to at least one of the electronic parts.

While it is the most desirable that a heat pipe should be used as the heat-conductive member with respect to the heat conductivity, a block such as metals, resins or rubber may be used. Furthermore, a Peltier element is used together to enhance the efficiency of heat conduction still more.

Furthermore, the present invention provides a method for manufacturing a housing for an electronic apparatus comprising the steps of applying an adhesive to a part of a metallic member and setting the metallic member in a metal mold, injecting a resin into the metal mold to change the resin into a molded resin member to be joined to the part onto which the adhesive, has been applied and forming an organic or inorganic film on another part of the metallic member.

The step of applying an adhesive to a metallic member and setting the metallic member in a metal mold includes a heat resistance rubber adhesive, such as a nitrile rubber or a chloroprene rubber, and a hot melt adhesive, such as polyurethane, being used for the adhesive which is applied to the metallic member in advance.

The adhesive is applied onto a portion necessary for the joining of the metallic member and the resin member and the application of the adhesive is done by using a masking method or a screen printing method.

The step of forming an organic or inorganic film on the outer surface of the metallic member may be performed either before or after the step of molding a housing.

After the step of molding a housing, the organic film may be formed on the outer surfaces of the metallic member and the resin member which have been joined.

According to the present invention, the metallic member and the resin member are molded integrally in such a manner that the metallic member forms the outer surface of the housing, and the outer surface of the metallic member is treated for enhancing the coefficient of heat radiation. Consequently, the heat generated from the electronic parts accommodated in the housing can be discharged efficiently to the outside of the housing. In addition, if the inner face of the metallic member is connected to the electronic portion through a heat conductive member, the heat generated from the electronic parts can be discharged to the outside more efficiently.

The present invention will be described in detail based on the preferred embodiments with reference to the drawings. The present invention should not be construed as being limited by the following embodiments.

First Embodiment

FIG. 1 is a perspective view showing a notebook-type personal computer according to a first embodiment of the present invention. A keyboard 2 is provided on the top face of a body 1. A LCD 4 is provided on the front face of a display portion 3. The body 1 and the display portion 3 are foldably connected through a hinge portion 5. The notebook-type personal computer has a dimension of 300×225×55 mm with the display portion 3 folded in the body 1.

Figure 2:
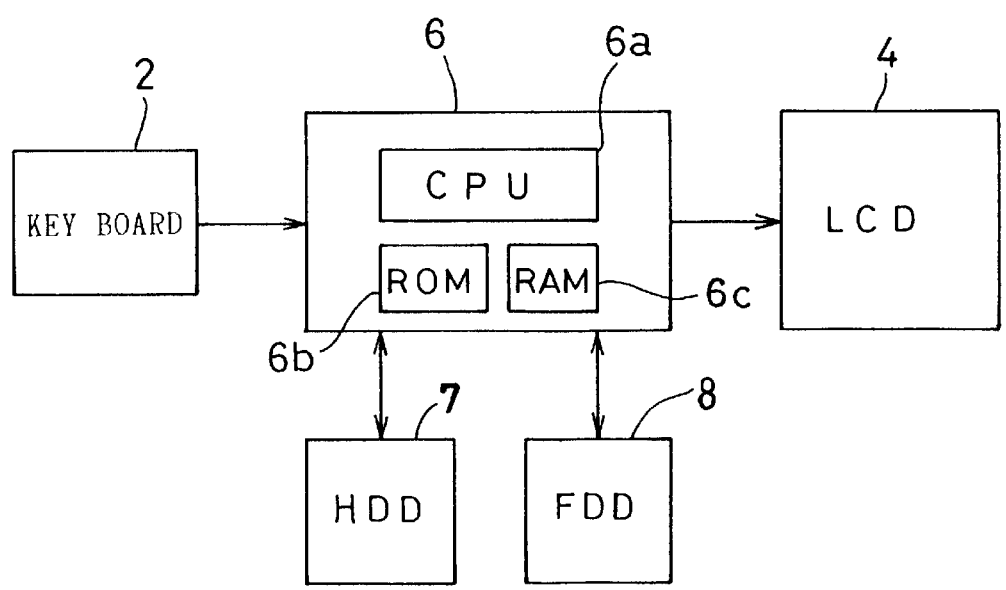
FIG. 2 is a block diagram showing an electric circuit according to the first embodiment.

FIG. 2 is a block diagram schematically showing an electric circuit of the notebook-type personal computer shown in FIG. 1. A control portion 6 comprising a CPU 6a, a ROM 6b and a RAM 6c processes data sent from the keyboard 2, a HDD (hard disk drive) 7 and a FDD (floppy disk drive) 8, and displays the results on the LCD 4.

Figure 3:
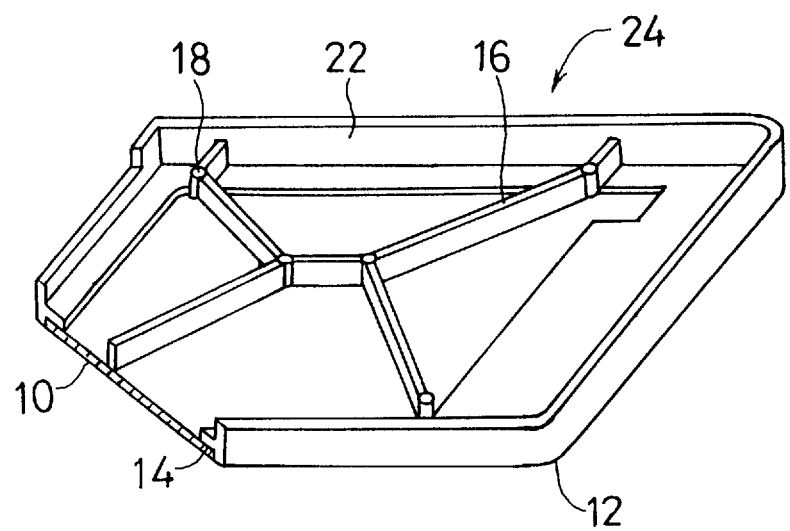
FIG. 3 is a partially broken perspective view showing a bottom cover according to the first embodiment.

FIG. 3 is a perspective view showing a bottom cover of a housing of the notebook-type personal computer shown in FIG. 1. A bottom cover 24 comprises an aluminum plate 10, a resin portion 12, an adhesive layer 14, a rib 16, a boss 18 and a rising portion 22.

Next, a method for manufacturing the bottom cover 24 will be described with reference to FIGS. 5(a) to (d).

Figure 4:
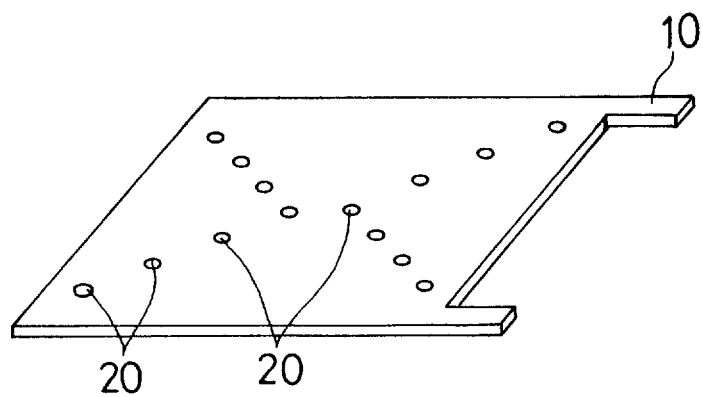
FIG. 4 is a perspective view showing an aluminum plate according to the first embodiment.

First of all, a hole 20 is formed on an aluminum plate 10 having a dimension of 150×250 mm and a thickness of 0.6 mm shown in FIG. 4. One of the faces of the aluminum plate is uniformly coated with an epoxy black coating material in a thickness of 30 μm, and is then dried (so that a coefficient of heat radiation is increased from 0.05 to 0.95). Furthermore, a portion of the other face of the aluminum plate, to which a resin should be bonded, is coated with a rubber adhesive in a thickness of 20 μm by a screen printing method, and is then dried (FIG. 5(a)).

Figure 5A:
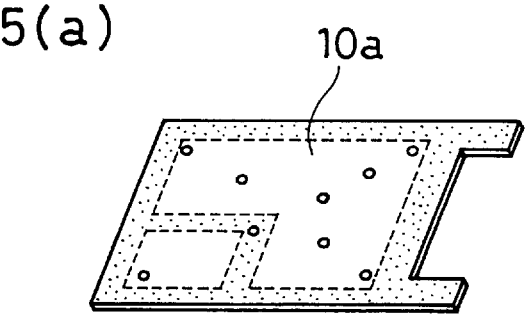
FIGS. 5(a) to 5(d) are views showing the steps of manufacturing the bottom cover according to the first embodiment.
Figure 5B:
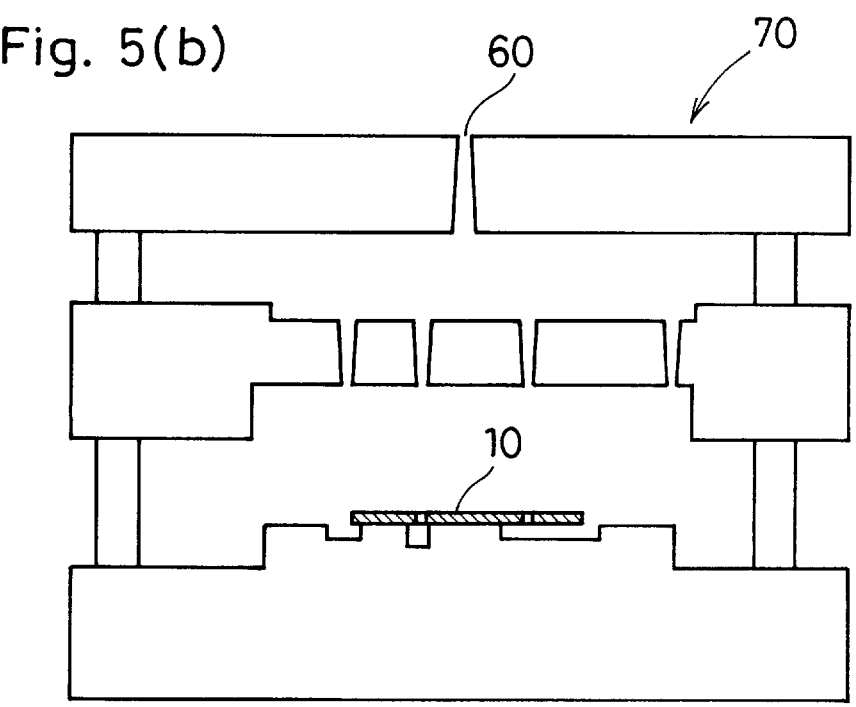
Figure 5C:
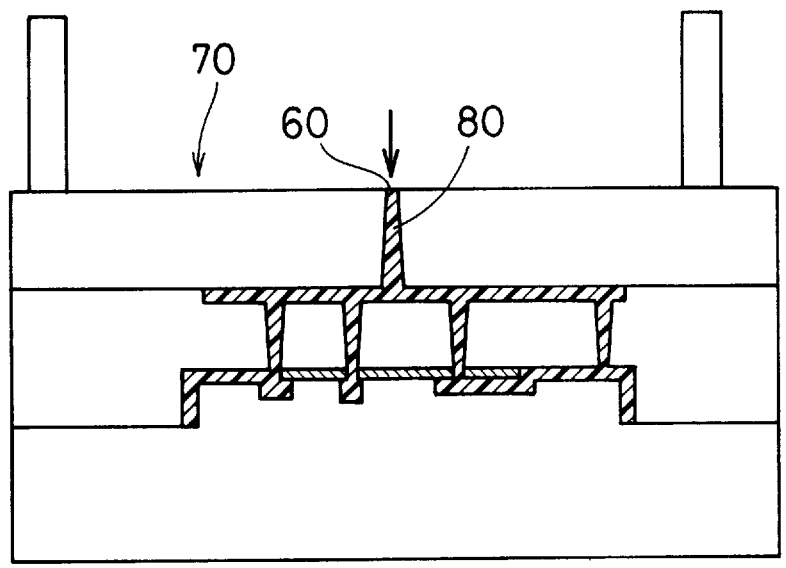
Figure 5D:
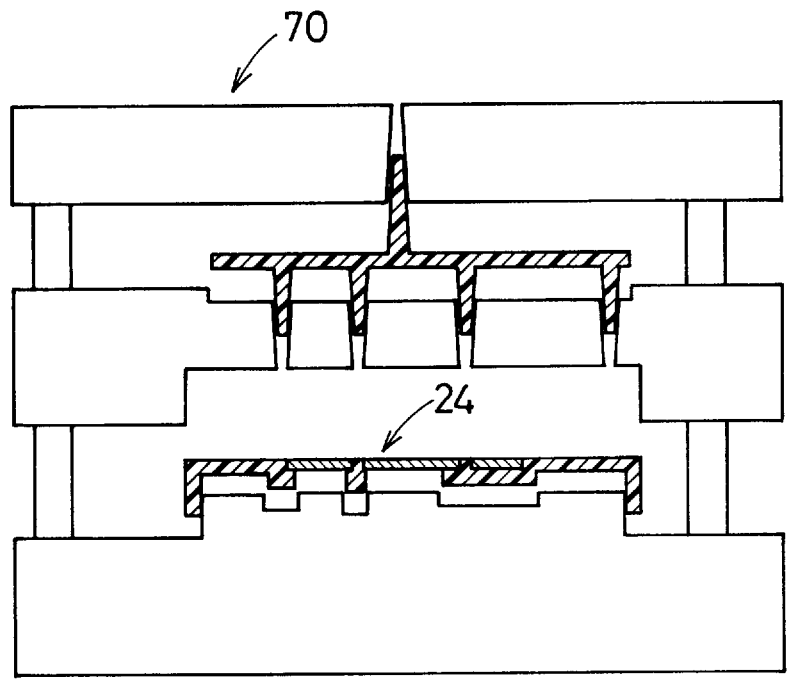

As shown in FIG. 5(b), the aluminum plate 10 is set in a metal mold 70 which is then clamped. Then, a PC-ABS resin (CYH-109 manufactured by Daicel Chemical Industries, Ltd.) is injected into the metal mold through an injection hole 60 as shown in FIG. 5(c). Thereafter, the mold 70 is opened so that the molded bottom cover 24 is taken out as shown in FIG. 5(d). Thus, the bottom cover 24 having the rib 16, the boss 18 and the rising portion 22 shown in FIG. 3 is molded. For the conditions of molding, a resin temperature is 240° C., an injection pressure is 600 kgf/cm², and an injection time is 1.5 sec.

The aluminum plate 10 has the hole 20 as shown in FIG. 4 because a resin 80 is injected into the metal mold through the hole 20 as shown in FIG. 5(c) to form the rib 16 and the boss 18 on the aluminum plate 10.

Figure 6:
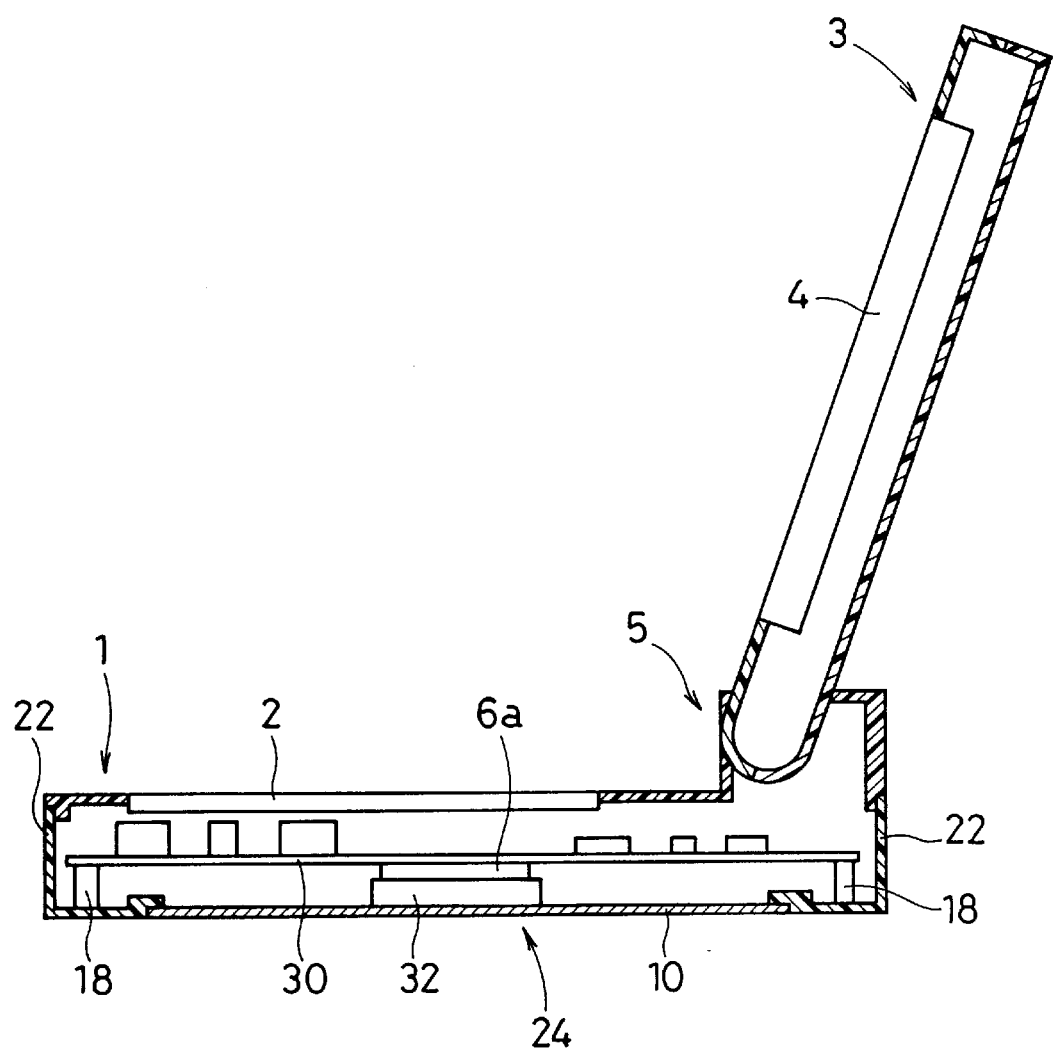
FIG. 6 is a cross sectional view showing a structure according to the first embodiment.

On the bottom cover 24 thus obtained, the aluminum plate 10 is molded integrally with the resin portion 12 and exposed to the outside of the bottom. The exposed surface has an organic film formed by the epoxy black coating material The notebook-type personal computer shown in FIG. 1 is manufactured from a housing using the bottom cover 24. FIG. 6 shows the structure of the housing and the arrangement of electronic parts which are accommodated in the housing.

As shown in FIG. 6, the electronic parts of the control portion 6 (FIG. 2), i.e., the CPU 6a and others, are mounted to both sides of a printed circuit board 30. According to the present embodiment, the CPU 6a has a calorific value of 6.5 W and other electronic parts have a calorific value of 20 W in total. The calorific value of the CPU 6a is greater than in the other electronic parts.

Accordingly, the CPU 6a is connected to the inner face of the aluminum plate 10 through a heat conductive member 32, i.e., a conductive rubber (TC-TKC manufactured by Shin-Etsu Silicone Co., Ltd.). The heat generated from the CPU 6a is discharged to the outside through the aluminum plate 10. The faces of the heat conductive member 32 adhere to the CPU 6a and the aluminum plate 10 very closely by the elasticity of the conductive rubber.

The notebook-type personal computer was driven in an atmosphere of 23° C. After a predetermined time (for the saturation of the temperature of each portion) passed, the temperature of each portion was measured by means of a thermoelectric couple. As a result, it was confirmed that the surface temperature of the CPU 6a (which is the highest) is not more than 61° C.

In the first embodiment, the temperature was measured in the same manner for the case where the outer face of the aluminum plate 10 (which is in contact with ambient air) is not coated (i.e., specular). As a result, the surface temperature of the CPU 6a was 75° C. and the temperatures of other portions were higher than those in the first embodiment by 10° to 13° C. Consequently, it was confirmed that a coating on the surface of the aluminum plate 10 greatly contributes to thermal emission.

Second Embodiment

Figure 7:
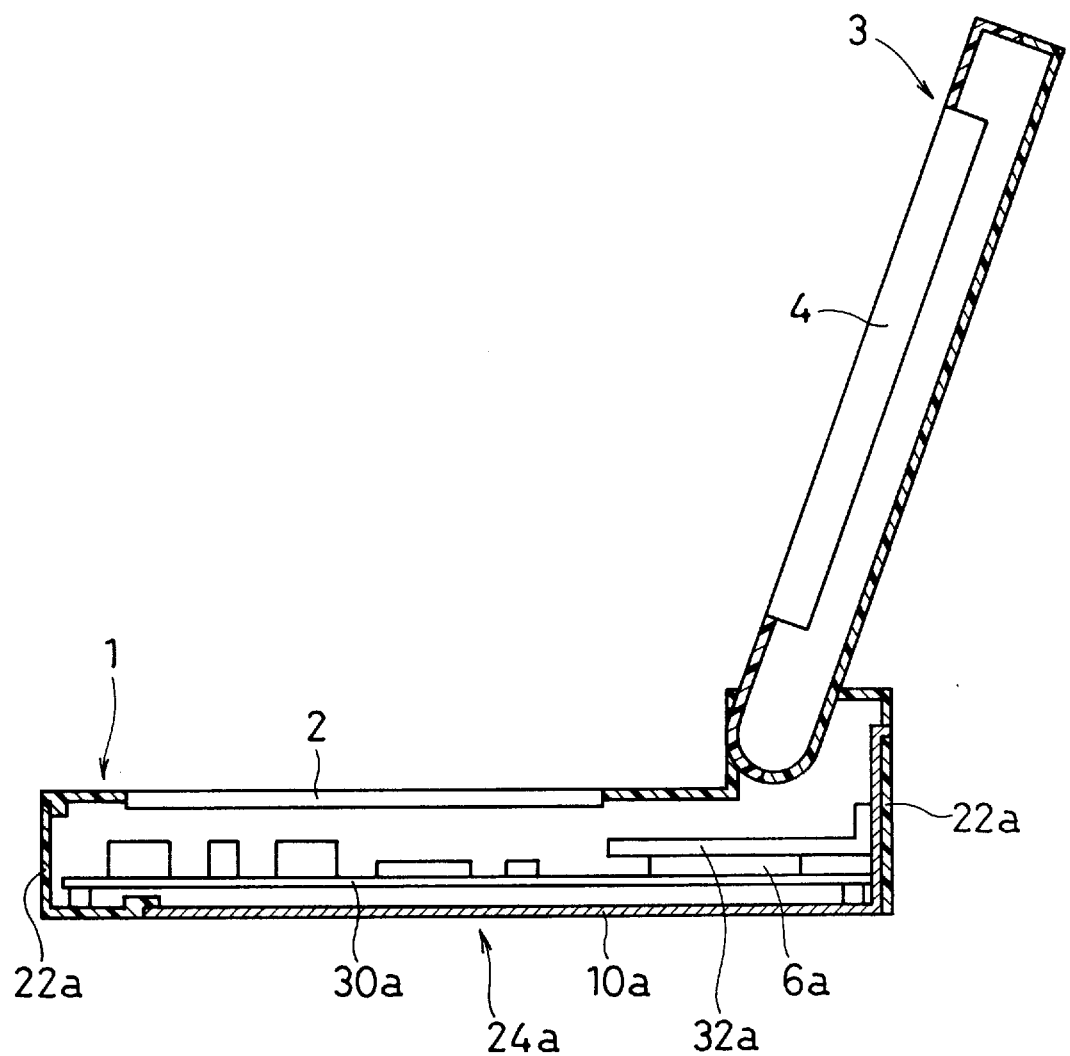
FIG. 7 is a cross sectional view showing a structure according to a second embodiment.

In a second embodiment, the bottom cover 24 of the housing, the printed circuit board 30 and the heat conductive member 32 in the notebook-type personal computer according to the first embodiment are altered as shown in FIG. 7, and other structures are the same as in the first embodiment.

According to the present embodiment, a bottom cover 24a has an L-shaped aluminum plate 10a molded integrally with a resin member in such a manner that its part rises along the inner face of a rising portion 22a of the bottom cover 24a.

A CPU 6a is provided on the top face of a printed circuit board 30a. An L-shaped aluminum plate having a thickness of 5 mm and a dimension of 50×70 mm is used for a heat conductive member 32a. The heat conductive member 32a has an end fixed to the inner face of the bottom cover 24a with a screw (not shown), and a face in close contact with the CPU 6a by using a thermal compound (G-747 manufactured by Shin-Etsu Chemical Co., Ltd.).

A method for manufacturing the bottom cover 24a will be described below with reference to FIGS. 8(a) to 8(d).

First of all, a necessary hole is formed on an aluminum plate 10a having a dimension of 110×280 mm and a thickness of 1 mm, and the aluminum plate is bent into an L-shape in the same manner as in the first embodiment. A portion to be exposed to the outside of the bottom cover 24a is coating with a coating material, and an adhesive is applied onto a portion which should come into contact with a resin member. These portions are dried in the same manner as in the first embodiment (FIG. 8(a)).

Figure 8A:
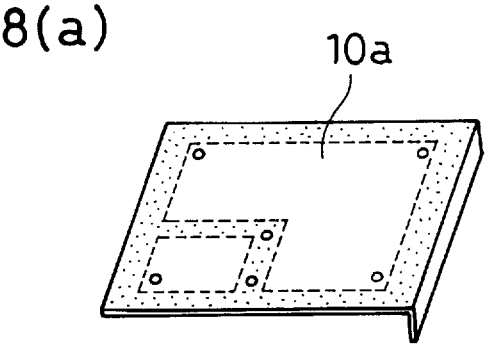
FIGS. 8(a) to 8(d) are views showing the steps of manufacturing a bottom cover according to the second embodiment.
Figure 8B:
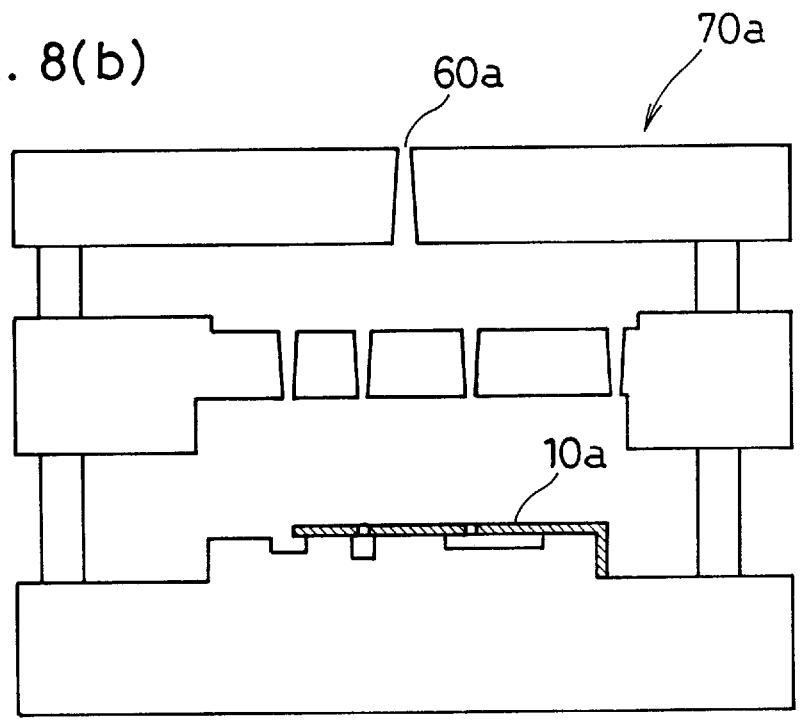
Figure 8C:
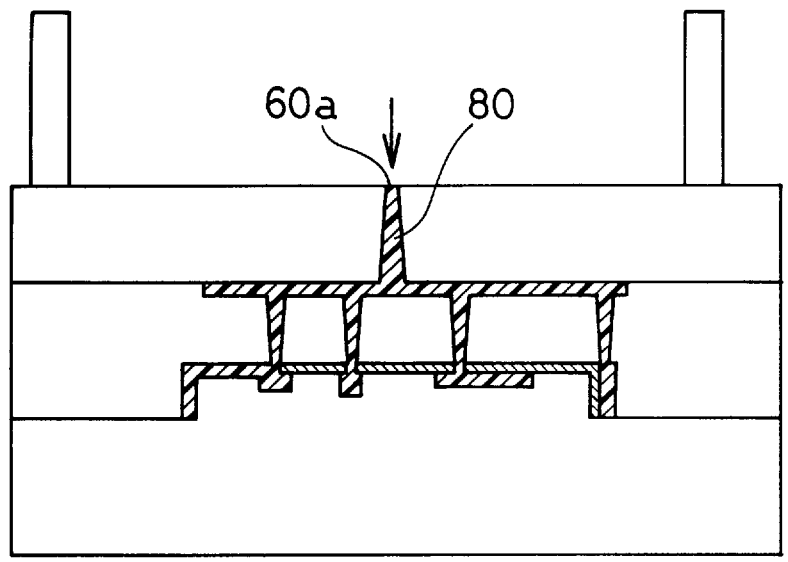
Figure 8D:
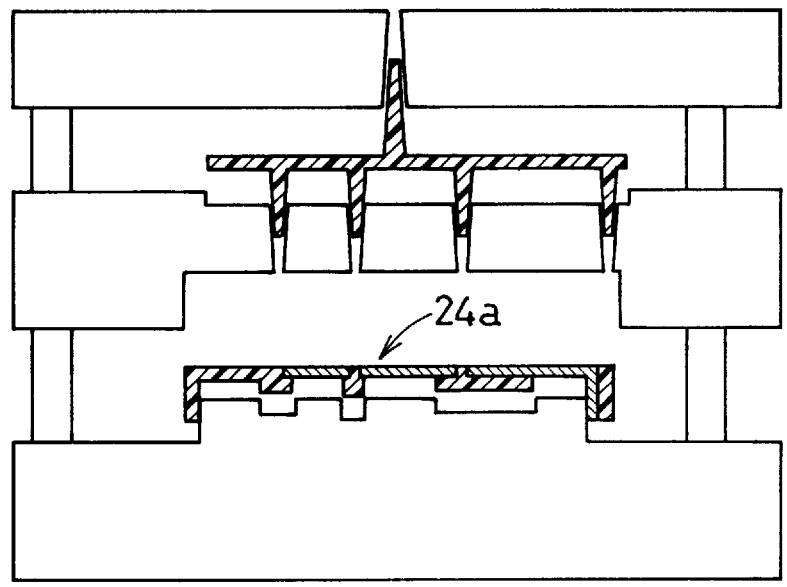

Then, an aluminum plate 10a is set into a metal mold 70a which is clamped as shown in FIG. 8(b). Thereafter, the same resin 80 as in the first embodiment is injected into the mold 70a through an injection hole 60a as shown in FIG. 8(c) so that the bottom cover 24a is molded. As shown in FIG. 8(d), the mold 70a is opened so that the molded bottom cover 24a is taken out. The conditions of molding are the same as those in the first embodiment.

In the bottom cover 24a thus obtained, the aluminum plate 10a is molded integrally with the resin and a part of the aluminum plate 10a is exposed to the outside of the bottom. The exposed face has an organic layer formed by an epoxy black coating material. Accordingly, heat generated from the CPU 6a is discharged efficiently to the outside of the housing through the heat conductive member 32a and the aluminum plate 10a.

Third Embodiment

Figure 9:
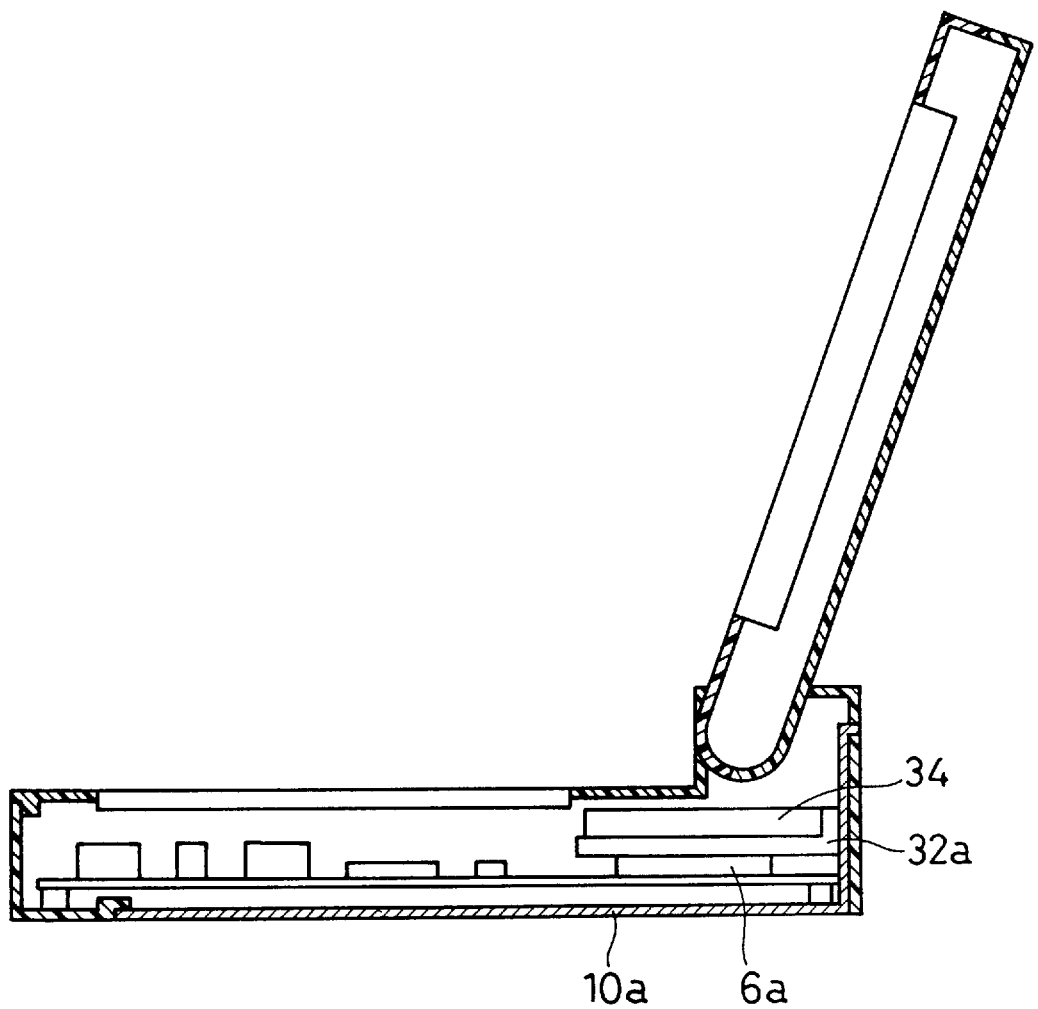
FIG. 9 is a cross-sectional view showing a structure according to a third embodiment.

In a third embodiment, as shown in FIG. 9, a heat storage block 34 is provided on the heat conductive member 32a of the second embodiment in order to increase the heat capacity of the heat conductive member 32a. Other structures are the same as in the second embodiment. The heat storage block 34 is formed by bonding an ABS resin plate having a thickness of 5 mm and a dimension of 50×70 mm onto the heat conductive member 32a with a rubber adhesive.

Figure 10:
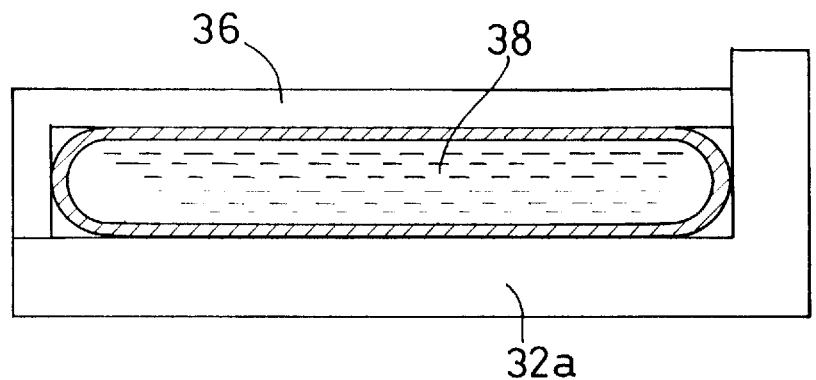
FIG. 10 is a cross-sectional view showing another example of main parts according to the third embodiment.

The combination of an L-shaped aluminum plate 36 having a thickness of 5 mm and a liquid heat sink 38 shown in FIG. 10 may be used for the heat storage block 34.

For example, an aluminum deposition multilayered film bag in which a carbon perfluoride solution is sealed can be used for the liquid heat sink 38. According to the third embodiment, the heat generated from a CPU 6a is first stored in the heat storage block 34 and then discharged efficiently to the outside through an aluminum plate 10a.

Fourth Embodiment

Figure 11:
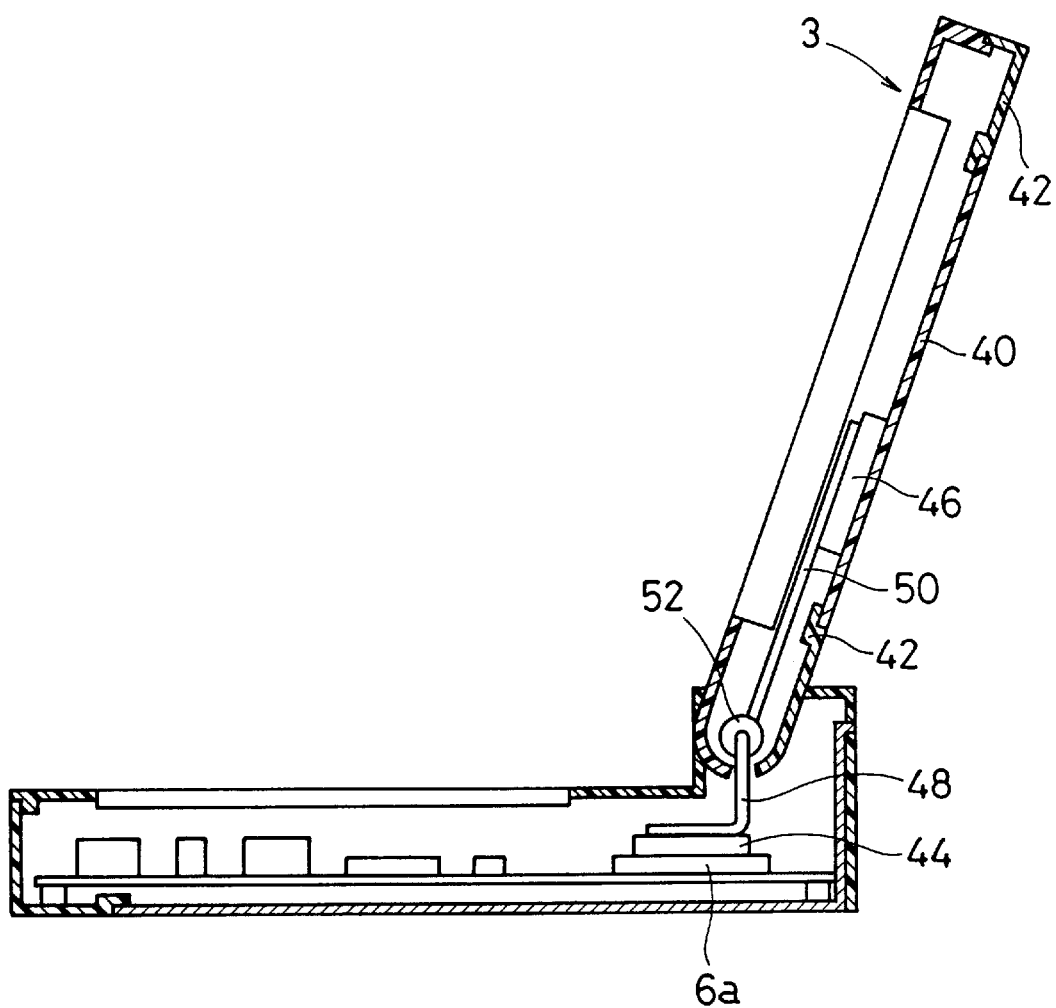
FIG. 11 is a cross-sectional view showing a structure according to a fourth embodiment.

In the fourth embodiment, a back cover of a housing of the display portion 3 in the notebook-type personal computer according to the second embodiment is molded integrally with an aluminum plate and a resin as shown in FIG. 11. A heat conductive member is provided for connecting the aluminum plate of the back cover to a CPU 6a, and other structures are the same as in the second embodiment.

In FIG. 11, the back cover of the display portion 3 comprises an aluminum plate 40 having a thickness of 1 mm and a dimension of 150×200 mm, and a resin member 42. The aluminum plate 40 is molded integrally with the resin member 42 by the same manufacturing method as shown in FIGS. 5(a) to 5(d). Accordingly, the outer face of the aluminum plate 40 is covered with an organic film which is formed by an epoxy black coating material in the same manner as in the first embodiment.

The heat conductive member comprises aluminum blocks 44 arid 46 bonded closely to the top faces of the CPU 6a and the aluminum plate 40, heat pipes 48 and 50, and a movable joint 52. The heat pipes 48 and 50 have ends joined with the blocks 44 and 46, respectively, and have other ends connected to each other through the movable joint 52. When the display portion 3 bends at the hinge portion 5 (FIG. 1), the heat pipes 48 and 50 can be bent interlockingly with the movable joint 52.

The heat pipes 48 and 50 each have a structure in which a steam flow path and a liquid reflux path (a capillary tube) are provided in a pipe. A heating medium (for example, pure water) is sealed for decompression and one end of the pipe is heated so that the heat medium is changed to steam flow and moved to the other end of the pipe. The other end of the pipe is cooled so that the heat medium is liquefied and refluxed to the heating side by capillary action.

A microheat pipe having a diameter of 2.3 mm, a length of 100 mm, and a power of 4.6 W (manufactured by The Furukawa Electric Co., Ltd.) is used for the heat pipes 18 and 50.

Figure 12:
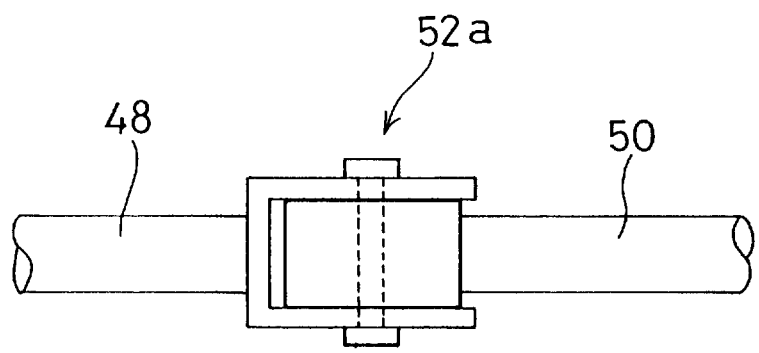
FIG. 12 is a front view showing an example of the structure of the main parts according to the fourth embodiment.
Figure 13:
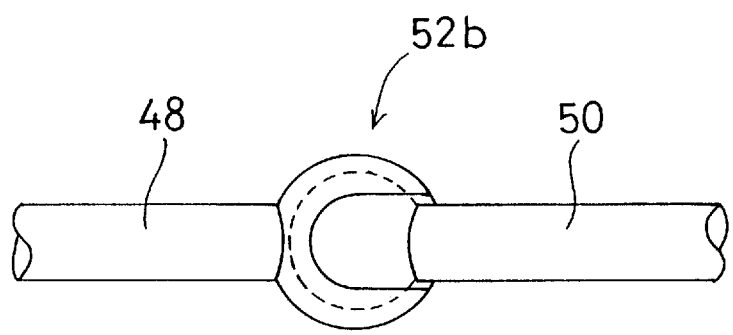
FIG. 13 is a front view showing another example of the structure of the main parts according to the fourth embodiment.

A metallic hinge joint 52a shown in FIG. 12 and a metallic ball joint 52b shown in FIG. 13 can be used for the movable joint 52. In this case, it is preferable that a thermal grease (SCH-20 manufactured by Sanhayato Co., Ltd.) should be used for the sliding portions of the hinge joint 52a and the ball joint 52b to enhance heat conductive properties and lubricating ability.

In the present embodiment, the heat generated from the CPU 6a is efficiently discharged to the outside through the heat pipes 48 and 50 and the aluminum plate 40.

If a Peltier element is inserted between the block 44 and the heat pipe 48, heat conduction efficiency is enhanced and the heat radiation efficiency of the CPU 6a is increased still more. The Peltier element is a thermoelectric cooling element formed by joining N- and P-type semiconductors with a metal piece. The Peltier element has a structure in which a direct current D.C. is caused to flow from the N-type semiconductor to the P-type semiconductor so that heat movement is generated in the direction reverse to the direction of current flow in the N-type semiconductor and in the forward direction in the P-type semiconductor so as to cool the metal piece which joins the N- and P-type semiconductors. For example, a Peltier element (KSMH 01031G type manufactured by Electronics Co., Ltd. 4.6 W) can be used.

According to the present invention, the metallic member and the resin member are molded integrally in such a manner that the metallic member forms the outer surface of the housing, and the outer surface of the metallic member is treated for enhancing the thermal emissivity thereof. Consequently, the heat generated from the electronic parts accommodated in the housing can be discharged efficiently to the outside of the housing. In addition, if the inner face of the metallic member is connected to the electronic portion through a heat conductive member, the heat generated from the electronic parts can be discharged to the outside more efficiently.

What is claimed is:

1. An electronic apparatus comprising:

a housing; and an electronic part accommodated in said housing, wherein said housing includes a metallic member and a resin member molded integrally with said metallic member, said metallic member forming an outside part of said housing, said metallic member having an outer surface treated with a material for enhancing a thermal emissivity thereof so that said material forms any one of an organic film and an inorganic film on said outer surface of said metallic member, said outer surface of any one of said organic film and said inorganic film having a surface roughness being at least a wavelength of infrared rays;

a heat conductive member, wherein said heat conductive member is housed within said housing so as to be in contact with an inner surface of said metallic member and wherein said heat conductive member is for connecting said inner surface of said metallic member and said electronic part;

a central processing unit, wherein said central processing unit is in contact with said heat conductive member; and wherein said heat conductive member comprises aluminum blocks bonded to an upper face of said central processing unit and an upper face of said metallic member.

2. The electronic apparatus as defined in claim 1, wherein said surface roughness is at least 0.7 µm.

3. The electronic apparatus as defined in claim 1, wherein said metallic member forms at least one of a bottom, a top and a side of said housing.

4. The electronic apparatus as defined in claim 1, wherein said metallic member is an aluminum plate.

5. The electronic apparatus as defined in claim 4, wherein said aluminum plate is L-shaped.

6. The electronic apparatus as defined in claim 5, wherein said aluminum plate has holes therethrough.

7. The electronic apparatus as defined in claim 1, further comprising an adhesive layer on an inner surface of said metallic member to bond said metallic member to said resin member.

8. The electronic apparatus as defined in claim 1, wherein said resin portion includes a plurality of bosses connected to a plurality of ribs, wherein said ribs are located adjacent an inner surface of said metallic member to strengthen said metallic member and to prevent said metallic member from being bent.

9. The electronic apparatus as defined in claim 1, wherein said material used to treat said outer surface of said metallic member is an epoxy black coating material.

10. The electronic apparatus as defined in claim 1, further comprising a heat storage means for increasing a heat capacity of said heat conductive member, said heat storage means being in contact with said heat conductive member.

11. The electronic apparatus as defined in claim 10, wherein said heat storage means comprises an ABS resin plate.

12. The electronic apparatus as defined in claim 10, wherein said heat storage means comprises a liquid heat sink.

13. The electronic apparatus as defined in claim 12, wherein said liquid heat sink comprises a carbon perfluoride solution sealed within an aluminum deposition multilayered film bag.

14. The electronic apparatus as defined in claim 1, further comprising a plurality of heat pipes and a movable joint, wherein said heat pipes have first ends joined with said aluminum blocks and second end connected to each other through a movable joint.

15. The electronic apparatus as defined in claim 14, wherein said movable joint is a metallic hinge joint.

16. The electronic apparatus as defined in claim 14, wherein said movable joint is a metallic ball joint.

17. A housing for an electronic apparatus comprising:
a metallic member; and
a resin member molded integrally with said metallic member, wherein said metallic member forms an outside part of said housing and said metallic member has an outer surface which is treated with a material for enhancing a thermal emissivity thereof so that said material forms any one of an organic film and an inorganic film on said outer surface of said metallic member, said outer surface of any one of said organic film and said inorganic film having a surface roughness being at least a wavelength of infrared rays;

a heat conductive member, wherein said heat conductive member is housed within said housing so as to be in contact with an inner surface of said metallic member and wherein said heat conductive member is for connecting said inner surface of said metallic member and said electronic part;

a central processing unit wherein said central processing unit is in contact with said heat conductive member; and wherein said heat conductive member comprises aluminum blocks bonded to an upper face of said central processing unit and an upper face of said metallic member.

18. The housing for an electronic apparatus as defined in claim 7, wherein said surface roughness is at least 0.7 µm.

19. The electronic apparatus as defined in claim 7, further comprising a heat storage means for increasing a heat capacity of said heat conductive member, said heat storage means being in contact with said heat conductive member.

20. An electronic apparatus comprising:
a metallic member;
a first housing having a first hollow portion therein;
a second housing having a second hollow portion therein, said second housing being adjacent to said first housing;
an electronic part positioned in said first hollow portion;
a heat radiating member positioned in said second hollow portion and partly exposed in a surface of said second housing; and
a heat conductive member passing through from said first hollow portion to said second hollow portion for connecting said electronic part to said heat radiating member, wherein said heat conductive member is housed within said housing so as to be in contact with an inner surface of said metallic member and wherein said heat conductive member is for connecting said inner surface of said metallic member and said electronic part;
a central processing unit, wherein said central processing unit is in contact with said heat conductive member; and
wherein said heat conductive member comprises aluminum blocks bonded to an upper face of said central processing unit and an upper face of said metallic member.

21. The electronic apparatus as defined in claim 29, further comprising a heat storage means for increasing a heat capacity of said heat conductive member, said heat storage means being in contact with said heat conductive member.

22. An electronic apparatus comprising:
a housing;
an electronic part accommodated in said housing, wherein said housing includes a metallic member and a resin member molded integrally with said metallic member, said metallic member forming an outside part of said housing, said metallic member having an outer surface treated with a material for enhancing a thermal emissivity thereof so that said material forms any one of an organic film and an inorganic film on said outer surface of said metallic member, said outer surface of any one of said organic film and said inorganic film having a surface roughness being at least a wavelength of infrared rays;

a heat conductive member, wherein said heat conductive member is housed within said housing so as to be in contact with an inner surface of said metallic member and wherein said heat conductive member is for connecting said inner surface of said metallic member and said electronic part; and a heat storage means for increasing a heat capacity of said heat conductive member, said heat storage means being in contact with said heat conductive member, wherein said heat storage means comprises a liquid heat sink and wherein said liquid heat sink comprises a carbon perfluoride solution sealed within an aluminum deposition multi-layered film bag.

\* \* \* \* \*